(12) United States Patent
Kruppa

(10) Patent No.: US 8,460,115 B2
(45) Date of Patent: Jun. 11, 2013

(54) BEARING BUSH SEAL ATTACHED TO A UNIVERSAL JOINT PIVOT PIN

(75) Inventor: Martin Kruppa, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 113 days.

(21) Appl. No.: 12/822,588

(22) Filed: Jun. 24, 2010

(65) Prior Publication Data

US 2011/0028226 A1     Feb. 3, 2011

(30) Foreign Application Priority Data

Jun. 25, 2009   (DE) .......................... 10 2009 030 372

(51) Int. Cl.
*F16D 3/84* (2006.01)
(52) U.S. Cl.
USPC ......................................................... 464/133
(58) Field of Classification Search
USPC ... 464/131, 133; 384/484, 485, 477; 277/551, 277/562, 566, 567, 585
See application file for complete search history.

(56) References Cited

U.S. PATENT DOCUMENTS

| | | | | |
|---|---|---|---|---|
| 4,147,041 A | * | 4/1979 | Girguis et al. | 464/133 |
| 4,614,446 A | * | 9/1986 | Dreschmann et al. | 384/484 |
| 5,613,691 A | * | 3/1997 | Komai et al. | 464/131 |
| 5,769,723 A | * | 6/1998 | Faulbecker et al. | 464/131 |
| 6,077,166 A | * | 6/2000 | Reynolds | 464/133 |
| 6,406,373 B1 | * | 6/2002 | Gibson | 464/133 X |
| 6,814,668 B2 | * | 11/2004 | Grupido | 464/133 |
| 6,964,613 B2 | * | 11/2005 | Hobaugh, II | 464/133 X |
| 7,052,401 B2 | * | 5/2006 | Mizuno et al. | 464/133 |
| 7,520,814 B2 | * | 4/2009 | Eversole et al. | 464/133 X |
| 2004/0166947 A1 | | 8/2004 | Mizuno | |
| 2008/0207339 A1 | * | 8/2008 | Jauernig et al. | 464/131 |

FOREIGN PATENT DOCUMENTS

| | | |
|---|---|---|
| DE | 2718503 A1 | 11/1978 |
| GB | 2072764 A | 10/1981 |

OTHER PUBLICATIONS

Webster's II New Riverside University Dictionary. Boston, MA: Riverside Pub. Co., 1984. p. 466. PE1625.W244.*

* cited by examiner

*Primary Examiner* — Gregory Binda
*Assistant Examiner* — Josh Skroupa
(74) *Attorney, Agent, or Firm* — Lucas & Mercanti, LLP

(57) ABSTRACT

A universal joint or a pivot pin cross with a universal joint pivot pin. A bearing bush seal is fastened to the universal joint pivot pin and absorbs an axially directed force. A universal joint is to be provided which is simple and can be manufactured inexpensively, which makes no compromises with respect to the sealing effect. For this purpose, a bearing bush seal is provided which deflects an axially directed force into a radial direction. This makes an axial stop at the universal joint pivot pin unnecessary. Moreover, manufacturing the bearing bush seal and the accommodation thereof at the universal joint pivot pin are accomplished in a single manufacturing step.

3 Claims, 1 Drawing Sheet

BEARING BUSH SEAL ATTACHED TO A UNIVERSAL JOINT PIVOT PIN

This application claims the priority of DE 10 2009 030 372.3 filed Jun. 25, 2009 which is incorporated by reference herein.

FIELD OF THE INVENTION

The invention relates to a universal joint pivot pin with bearing bush seal attached to the universal joint pivot pin, wherein the bearing bush seal is intended for receiving an axially directed force. Moreover, the invention relates to a pivot pin cross and a universal joint with at least one such universal joint pin.

Known from GB 2 072 764 A is a universal joint which has external bearing bush seals which are arranged at the universal joint pivot pin and have a surface on which the bearing bush axially contacts the bearing bush. This axially directed force is transmitted from the bearing bush via the bearing bush seal axially to the universal joint pivot pin which has several cylindrical sections with different external diameters. When installing this universal joint, it has been found to be disadvantageous that the bearing bush seal must be mounted in a separate manufacturing step on the pivot pin. Moreover, an axial contact for the axial force transmission on the universal joint pivot pin is necessary (particularly during installation).

U.S. Pat. No. 7,052,401 discloses an external seal for a universal joint which has two sealing lips and, if necessary, is also mounted in the central inner part of the universal joint pivot cross.

DE 27 18 503 A1 discloses a sealed pivot pin cross which can be sealed by an internal seal for a bearing bush. During installation, the bearing bush seal is initially placed in the bearing bush and is then, together with the latter, pushed onto the universal joint pivot pin. The axial seal is affected by a sealing contact of a radial sealing lip with a ring-shaped surface of the universal joint pivot pin. However, also in this case, a separate manufacturing step is required in which the bearing bush seal is mounted on the bearing bush. In addition, an axial stop is required at the universal joint pivot pin for interacting with the bearing bush seal and which must also be manufactured in another work step.

SUMMARY OF THE INVENTION

The invention is based on the object of providing a universal joint which is simple and inexpensive to manufacture and wherein advantageous sealing properties of the bearing bush seal do not have to be forfeited.

In a universal joint pivot pin of the above-described type, this object is met by enabling the bearing bush seal to divert the axially directed force into a radial direction. Correspondingly, this object is met by a pivot pin cross and a universal joint with such a universal joint pivot pin.

In accordance with the invention, it is provided that the bearing bush seal, which is formed, for example, of an elastomer, is fastened to the universal joint pivot pin, so that the bearing bush seal is in the position of redirecting an axially directed force which is transmitted to the bearing bush seal into a radial direction. The axially directed force is transmitted to the bearing bush seal by the bearing bush directly or indirectly. The bearing bush seal changes the axial direction of this force at least partially or entirely into a radial direction, i.e., in the direction of the axis of rotation of the bearing bush located within the universal joint pivot pin. This causes the force to be transmitted to the universal joint pivot pin via the fastening surface of the bearing bush seal. Advantageously, this has the result that no axial stop at the universal joint pivot pin is required because the force transmission takes place over the fastening surface.

The fastening of the bearing bush seal at the universal pivot pin is combined with the manufacture of the bearing bush seal. As a result, two steps for manufacturing a pivot pin cross are combined into a single step. In other words, the manufacture and mounting of the bearing bush seal now constitutes only a single manufacturing step.

Advantageously, the bearing bush seal does not have to be mounted separately because it is already mounted on the universal joint pivot pin. Consequently, this results in a captive retention means of pivot pin crosses which as intermediate products could be handled without problems and without having to expect losses of bearing bush seals.

Advantageously, it is possible to ensure a very accurate axial position of the bearing bush seal, so that the stability of the sealing arrangement of the universal joint is improved. Moreover, this also prevents so-called infiltration under the seal at the pin seat. In the past, this caused dirt and water to penetrate at the pin seat in the direction of the bush interior.

In accordance with an advantageous embodiment, the bearing bush seal is glued, vulcanized or injection molded onto the pivot pin. The determining factor is that during the manufacture of the bearing bush seal a manufacturing step is used which simultaneously permits fastening of the bearing bush seal which, for example, may be a ring-shaped elastomer. If the material of the bearing bush seal reaches, for example, an adhesive state during its shaping, gluing of the bearing bush seal to the universal joint pivot pin takes place simultaneously.

Alternatively, starting from a rubber-containing raw material the bearing bush seal can be vulcanized on to the pivot pin. During curing of the rubber produced during the vulcanization, the seat of the rubber on the universal joint pivot pin is also ensured by the curing.

In accordance with an alternative solution, the bearing bush seal can be injection molded, i.e., applied and formed by an injection molding method on the universal joint pivot pin. The injection molding process is a method of processing rubber mixtures in which the heated material is injection molded through a distribution system for the introduction of material into a tool sleeve. The tool sleeve is placed at the universal joint pivot pin, wherein a ring-shaped area thereof, similar to the tool sleeve, delimits an outer surface of the bearing bush seal to be manufactured and the bearing bush seal is simultaneously fastened on the ring-shaped area during the injection process. Advantageously, the high degree of automation of the injection molding process leads to an improved efficiency.

In accordance with an advantageous embodiment, the bearing bush seal is provided as an axial stop of a bearing bush. The advantage of this is the fact that the bearing bush seal does not have to be arranged with high precision on the universal joint pivot pin in a second work step, but rather the bearing bush seal is already assuming the optimum position. It is also advantageous if the bearing bush seal which usually consists of an elastomer part has, for example, a ring-shaped surface adjacent to which is provided an end piece of the bearing bush is located and the elastomer part is locally contacted in such a may that a sliding sealing contact is achieved. Another advantage of this configuration is the fact that no sealing lips have to be formed on the elastomer.

In accordance with an advantageous embodiment, the axially directed force is a pretensioning force for pretensioning at least one axial sealing lip formed on the bearing bush seal.

Axial sealing lips form relative to these movable structural components, such as in this case the bearing bush, a sliding sealing contact which protects the interior of the bearing bush and, thus, also the running surfaces of the rolling bodies against environmental influences, such as, for example, moisture or foreign particles. Simultaneously, axial sealing lips permit a pressure equalization toward the outside if a temperature increase due to friction should occur and, thus, to a high internal pressure which, in turn, provides the result that the lubricant finds a way towards the outside past the axial sealing lip.

It is also advantageous that a sealing lip of an already fastened bearing bush seal cannot be disadvantageously deformed during the installation procedure during pressing on of the sealing lip.

In an advantageous embodiment, two axial sealing lips are simultaneously pretensioned by the axially directed force between bearing bush and bearing bush seal, i.e., they are intended for the sliding contact against a bearing bush which surrounds the universal joint pivot pin. Structural space is saved if both axial sealing lips have different radii, or if one sealing lip surrounds the other sealing lip at least partially. Consequently, by means of a cascade-type arrangement both axial sealing lips can advantageously increase the sealing effect.

Advantageously, the axial lip or lips are resting against a rounded surface of the bearing bush. The advantage of that is the fact that this feature results, in addition to the sealing contact, in a gap seal between the bearing bush and the universal joint pivot pin. Moreover, the gap seal can, for example, form, together with the sealing lips and the bearing bush seal itself, a labyrinth seal.

In accordance with an advantageous embodiment, a pivot pin cross has one, two, three or four universal joint pivot pins according to the present invention. This significantly reduces the assembly time of the universal joint because no other operations have to be carried out for the already formed-on bearing bush seals. In addition, the sealing rings cannot get lost during the assembly of the joint because they are fastened to the pivot pins.

In accordance with an advantageous embodiment, at least one bearing bush is mounted on a pivot pin cross, and rolling bodies are arranged which roll between the pivot pins and the bearing bush. If all universal joint pivot pins, usually four, are arranged, then the pivot pin cross forms a complete universal joint.

In an advantageous embodiment, a universal joint is constructed as a drive joint or steering joint. It is a drive joint if it is usable for the transmission of torque within a drive train. It is a steering joint if it is a component of a steering system, for example, of a motor vehicle.

Other advantageous configurations of the invention can be found in the description of the drawings and/or the dependent claims.

DESCRIPTION OF THE DRAWINGS

In the drawing:

FIG. 1 shows a sectional view of a first sealing arrangement 1 of a universal joint with an axial sealing lip 7. The sealing arrangement 1 is one of four of a universal joint.

Figure 1:
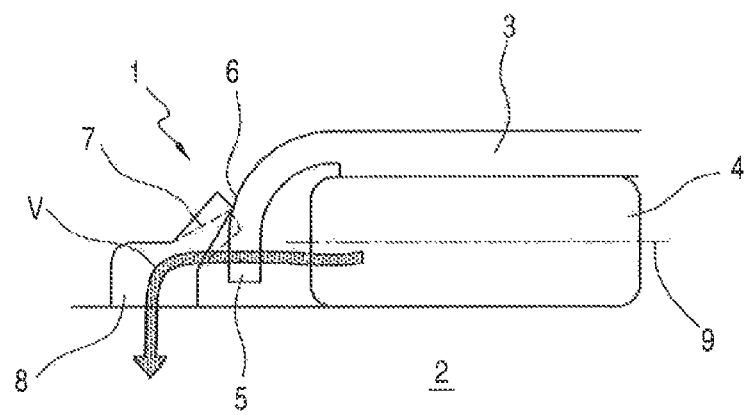
FIG. 1 is a sectional view of a first sealing arrangement of a universal joint with an axial sealing lip.

The incompletely illustrated universal joint pivot pin 2 has an injection molded bearing bush seal 8 with an axial sealing lip 7. Prior to the installation of the bearing bush 3, the axial sealing lip 7 is in the position indicated by broken lines. When the bearing bush 3 is installed, the end piece 5 thereof pretensions the axial sealing lip 7 in the axial direction and places an axial load on the sealing lip. This direction is axial in relation to the axis of rotation of the bearing bush 3, wherein the axis of rotation extends parallel to the axis of symmetry 9 of the rolling bodies 4 which is not illustrated in FIG. 1.

The ring-shaped bearing bush seal 8 is placed during its deformation directly on the pivot pin 2. This can be effected, for example, by means of injection molding, wherein the bearing bush seal 8 is connected subsequently without further securing means tightly to the pivot pin 2.

The axial sealing lip 7 rests on the rounded surface 6 of the end piece 5 of the bearing bush 3. As a result of the round configuration, it is possible to compensate for any possible axial deviations of the bearing bush 3, or to leave tolerance intervals at an advantageously large size. Consequently, the bearing bush seal 8 together with the pivot pin 2 closes off the open end of the bearing bush 3.

The bearing bush seal 8 advantageously acts as an axial stop for the bearing bush 3 because the force V acting in the axial direction is absorbed by the bearing bush seal 8 and is transmitted radially to the pivot pin 2. As a result, it is not necessary to integrally form portions with different outer diameters onto the pivot pins 2. Such work steps have become entirely unnecessary. The force V which acts in the axial direction is caused by the close proximity of the bearing bush seal 8 to the bearing bush 3 and is used for pretensioning the axial sealing lip 7. It is certainly also possible to provide axially relative to the bearing bush seal 8 an axial stop of the pivot pin 2. Even though this is technically no longer necessary, it is however certainly possible to combine the described teaching with conventional universal joints with axial stops at the pivot pins, and possibly to produce a desired compatibility.

Figure 2:
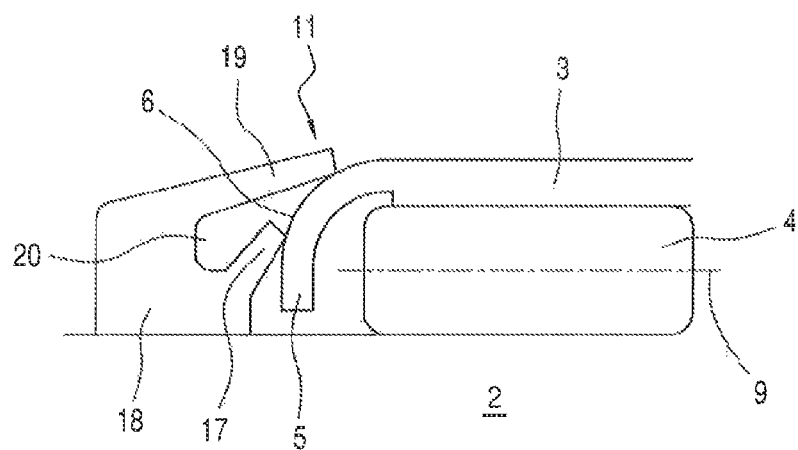
FIG. 2 is a sectional view of a second sealing arrangement of a universal joint with two axial sealing lips.

FIG. 2 shows in a sectional view a second sealing arrangement 11 of a universal joint with two axial sealing lips 17, 19.

For the structural components already described in connection with the first embodiment of FIG. 1, the description of FIG. 1 is applicable.

The sealing arrangement 11 includes a bearing bush seal 18, a first axial sealing lip 17 and a second axial sealing lip 19. Both sealing lips 17, 19 rest sealingly under pretension against the rounded surface 6 of the end piece 5 of the bearing bush 3.

A ring-shaped space forms between the axial sealing lips 17, 19 which is capable of catching liquids and dirt particles as a catching groove 20 acting within a sealing arrangement 11 constructed as a labyrinth seal, and can conduct the liquids and dirt particles in the circumferential direction. The two axial sealing lips 17, 19 are preferably cascaded (arranged one after the other), so that the sealing arrangement 11, even in the case of a comparatively rapid erosion of the first axial sealing lip 19, still has an internal sealing contact. Consequently, the universal joint has a longer service life.

In summary, the invention relates to a universal joint or a pivot pin cross with a pivot pin, wherein a bearing bush seal is arranged on the pivot pin and is provided for receiving an axially directed force. A universal joint is to be provided which is simple and can be manufactured inexpensively, wherein no compromises are made relative to the sealing effect. For this purpose, a bearing bush seal is provided which is intended for deflecting an axially directed force into a radial direction. This makes an axial stop at the universal joint pivot pin unnecessary and no longer has to be provided. In addition, there are advantages with respect to the manufacture of the universal joint as a result of the fact that the manufacturing step for producing the bearing bush seal and mounting thereof at the pivot pin can now be accommodated within a single manufacturing step.

LIST OF REFERENCE NUMERALS

1 Pivot joint
2 Universal pivot joint pin
3 Bearing bush
4 Rolling body
5 End piece
6 Rounded surface
7 First axial sealing lip
8 Bearing bush seal
9 Axis of symmetry of the rolling bodies
11 Pivot joint
17 First axial sealing lip
18 Bearing bush seal
19 Second axial sealing lip
20 Catching groove

The invention claimed is:
1. A universal joint pivot pin, comprising;
a bearing bush; and
a bearing bush seal fastened to the universal joint pivot pin by gluing, vulcanization or injection molding,
such that the bearing bush seal absorbs an axially directed force, and
such that the bearing bush seal deflects all of the axially directed force into a radial direction without axially abutting the universal joint pivot pin,
wherein the bearing bush seal is an axial stop of the bearing hush in the insertion direction of the bearing bush, the axially directed force is a pre-tensioning force for pre-tensioning at least one axial sealing lip formed at the bearing bush seal, and the one axial sealing lip, or at least two axial sealing lips, are intended for sliding contact with the bearing bush which surrounds the universal joint pivot pin,
the bearing bush surrounding the universal joint pivot pin and having an end piece facing the bearing bush seal that exhibits a convex rounded surface, wherein the axial sealing lip, or the axial sealing lips, rest solely against the rounded surface the bearing bush.

2. The universal joint pivot pin according to claim 1, wherein the bearing bush seal is only radially fastened to the universal joint pivot pin.

3. The universal joint pivot pin according to claim 1, wherein the end piece of the bearing bush has a first end connected to the bearing bush and a free end, the end piece extends increasingly radially inwardly from the first end to the free end.

\* \* \* \* \*